United States Patent Office 3,443,694
Patented May 13, 1969

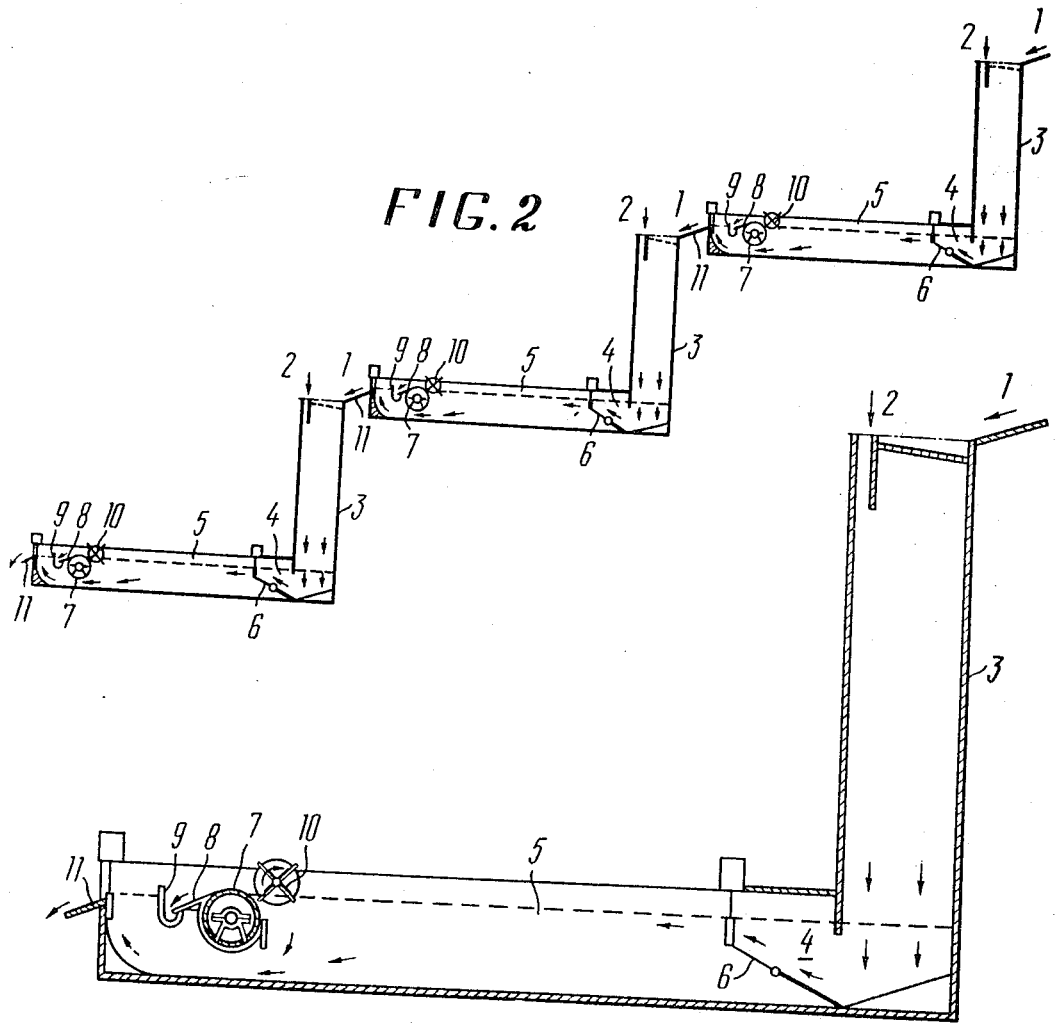

3,443,694
PURIFICATION OF LIQUIDS
Vsevolod Alexandrovich Malinovsky, Ljubertsy, pos.
I.G.D. 16, kv. 35, Moscovskaya Oblast, U.S.S.R.
Filed June 20, 1966, Ser. No. 558,716
Int. Cl. C02b 9/02; C02c 1/28
U.S. Cl. 210—201
4 Claims

ABSTRACT OF THE DISCLOSURE

Apparatus for purifying liquid containing hydrophobic substance comprising a settling tank or plural tanks, having a vertically arranged chamber at one end in which the liquid is saturated with air and an adhesion drum cooperating with an impeller near the other end. A rotatable shield controls the depth of the stream.

The present invention relates to apparatus for carrying out methods for the purification of liquids from hydrophobic substances and matters having a density less than or equal to that of the liquid being purified, preferably sewerage waters of the petroleum industry and petroleum refining, machine-building plants, etc.

To purify liquids from hydrophobic substances and matters having a density less than that of the liquid being purified, there are employed a plurality of methods, including those based on gravitational properties, said methods being designed to extract the substances in the Earth's gravity field, such as settling tanks of various types (grit chambers, oil catchers, grease extractors, ponds for additional settling, etc.).

In these methods substances, having a density less than that of the liquid being purified, rise to the surface and are removed by means of special appliances.

Disadvantages of these methods are a slow rising of substances in the liquid being purified, which necessitates the construction of bulky purifying plants, and a low degree of purification of liquids.

There is known a method based on the gravitational extraction of the hydrophobic substances from liquids in combination with flotation by saturating the liquid which flows through the settling tank with dispersed air for example, by forcing the air into the liquid through finely porous plates placed on the bottom of the settling tank.

Such a combined method, however, does not eliminate the disadvantages inherent to the gravitational methods.

It has also been common practice to employ more efficient methods, such as foam and vacuum flotation, and quartz filters; however, all these methods require consumption of energy as great as 1 kw. per cu.m. of liquid being purified, high capital expenditures for the construction of filters and great maintenance costs.

An object of the present invention is to provide a method of purifying liquids, eliminating or minimizing the disadvantages of the above-mentioned methods.

The principal object of the present invention is accordingly the provision of a method and apparatus which permits the efficient, simple and easily controllable purification of liquids, requiring small capital expenditures and maintenance costs, consuming but a small amount of energy, and requiring a minimum floor space to locate the purifying structures.

Said object was accomplished by the provision of a method of purifying liquids in horizontal settling tanks, in which the liquid to be purified is saturated with a gas, preferably air. According to the present invention, the gas used to saturate the liquid to be purified is introduced together with the current thereof, which is supplied into the settling tank under a pressure greater than the maximum hydrostatic pressure in the settling tank; the liquid saturated with the dispersed and dissolved gas, is directed into the upper layer of the horizontal current flowing in the settling tank in the fore portion of said stream, while the substances which float up are removed from the rear portion of said stream.

For this purpose oxygen, ozone, carbon dioxide or mixtures thereof with air may be employed.

To effect the proposed method, it is expedient to throw the liquid to be purified through a free spillway from a height above the level of the settling tank exceeding the depth of the liquid contained therein. With the liquid falling there occur the dispersion and dissolution of air entrained by it with the formation of a highly developed surface of air bubbles, contributing to the extraction of the hydrophobic substances to the surface of the liquid.

The concentration of the hydrophobic substances at the interface liquid-atmospheric air is ensured by the air dispersed and the gases dissolved in it, evolving with the pressure drop on the hydrophobic substances in the form of air bubbles. In condtradistinction to the flotation method, the air bubbles are employed only to extract the hydrophobic substances to the liquid-atmospheric air interface.

In the event that there is a great amount of substances floating up in the settling tank, these substances are divided during their removal from the settling tank into two layers, of which the lower layer is returned into the stream of liquid supplied under pressure into the settling tank.

The apparatus of the invention comprises a horizontal settling tank in which there is provided a chamber for the supply of the liquid being purified and its saturation with gas, said chamber communicating with the settling tank in its upper portion. It is expedient to provide the chamber in its upper portion with a shield rotatable about the horizontal axis, said shield being designed to control the depth of the horizontal stream of liquid, over flowing from the chamber into the settling tank.

There is also possible an embodiment of the present invention, in which the liquid to be purified is supplied into the settling tank via a pressure pipe-line wherein the liquid to be purified is saturated with air. It is expedient to make the pipe-line V-shaped, placing its lower portion beneath the settling tank.

A further embodiment of the apparatus to put into effect the method according to the present invention is an apparatus comprising a plurality of settling tanks arranged in a stepwise manner with a successive draining of the liquid from one settling tank into another through free spillways. In each settling tank there is provided a means for removing the floated-up substances.

The present invention will become more fully apparent from a consideration of the following description of exemplary embodiments of the devices for the purification of sewerage waters of the petroleum industry and petroleum refining, taken in conjunction with the appended schematic drawing in which:

FIG. 1 is a diagram showing an apparatus with one settling tank, and with the supply of the liquid to be purified through a free spillway;

FIG. 2 is a diagram showing an apparatus with a plurality of settling tanks and a free spillway;

Figure 3:
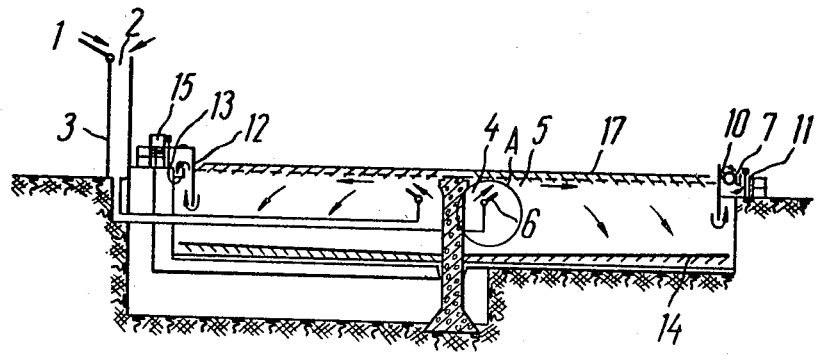
FIG. 3 is a vertical cross-sectional view of an apparatus with a settling tank of round shape and the supply of the liquid to be purified through a free spillway.
Figure 7:
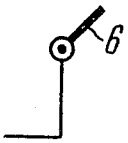
FIGURE 7 is an enlarged view of the shield.

In the apparatus according to FIG. 1, the liquid to be purified is drained through a spillway 1 together with air 2 entrained by the liquid via a shaft 3 into a chamber 4, wherefrom it passes into the upper portion of settling tank 5. The work performed by the falling liquid, ensures the dispersion and dissolution of air with the formation of a highly developed surface of air bubbles.

The hydrophobic substances and those having a density less than or equal to that of the liquid accumulate at the liquid-atmospheric air interface and are directed by a shield 6 in horizontal streams to a device intended for the separation of the floating substances from the liquid.

This device is based on the use of adhesion forces of the floated-up substances to the surface of drum 7, being essentially of the same type for all the embodiments of the plant as described below. The device comprises a hollow drum 7, rotating at a speed of 5 to 6 r.p.m., a knife 8, to remove the substances arriving on the adhesion drum, a trough 9, through which these substances are removed, and a metal jacket, disposed under the adhesion drum, said jacket preventing the substances, supplied on the adhesion drum, from getting into the liquid being purified. The adhesion drum may be of any length with sets of individual drums and knives provided on a common shaft. Mounted in front of the adhesion drum is a rake-type impeller 10, rotating at a speed of 2 to 4 r.p.m., said impeller being designed to create a quiet zone before the drum and directing to it the floated-up substances.

The depth of the separation zone is controlled by the raising and lowering of shield 6 by means of an automatic device depending on the amount of liquid supplied. The purified liquid flows over a drain sill 11, which is preferably controlled also by means of an automatic device. In the plant according to FIG. 2, the separated liquid is supplied into the following settling tank down the cascade.

Figure 4:
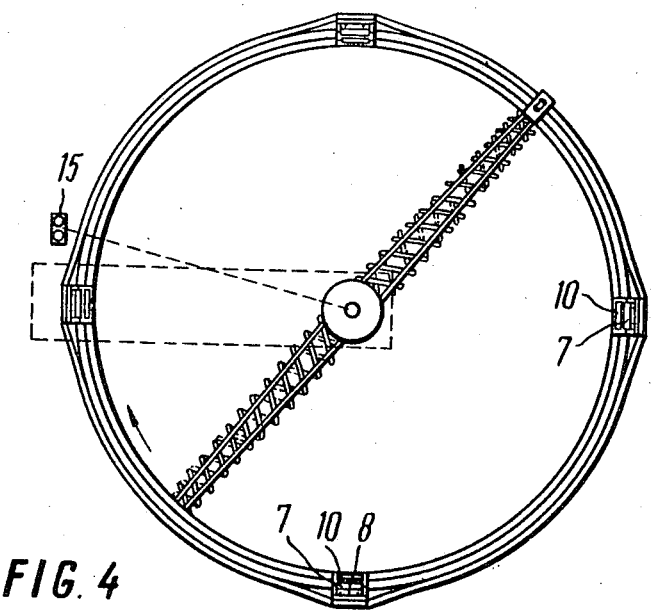
FIG. 4 is a plan view of FIG. 3.

A second embodiment of the apparatus (according to FIGS. 3 and 4) is designed to separate from liquids large amounts of hydrophobic substances and those substances having a density less than or equal to that of the liquid.

The liquid to be purified is drained from the spillway via the shaft 3 into the chamber 4. The substances, whose density is less than or equal to that of the liquid, rise and are withdrawn by the guiding shield 6 from the chamber 4 into the settling tank 5 in horizontal streams. Flowing under the action of rakes disposed above and rotating in the horizontal plane, from the periphery, the horizontal streams are directed to the adhesion devices.

The upper layer of the floated-up substances is removed by means of the same devices as those used in the foregoing embodiments of the plant, as ready dehydrated product (for example, oil), while the lower layer with a markedly decreased content of floating substances and a portion of liquid in an amount of 10 to 20% of the total amount of the purified liquid are pumped for an additional purification into the chamber 4 via the drain sill 11, controlled by means of the automatic device.

The purified liquid (80 to 90%), when passing under a rim 12 retaining the floated-up substances, flows over into a drain trough 13, while the substances settled down, whose density is in excess of that of the liquid, are removed either by rakes 14 or a suction device and pump 15.

Figure 5:
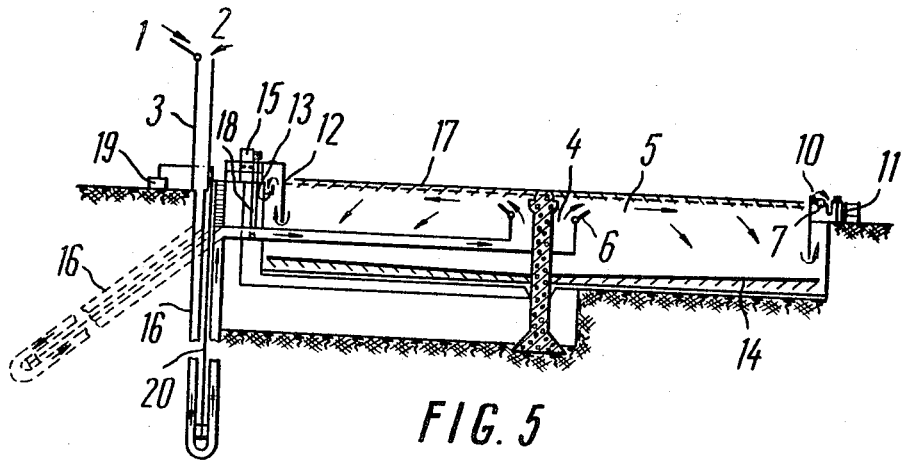
FIG. 5 is a vertical cross-sectional view of an apparatus with a settling tank of round shape and the supply of the liquid to be purified through a pressure pipe-line.
Figure 6:
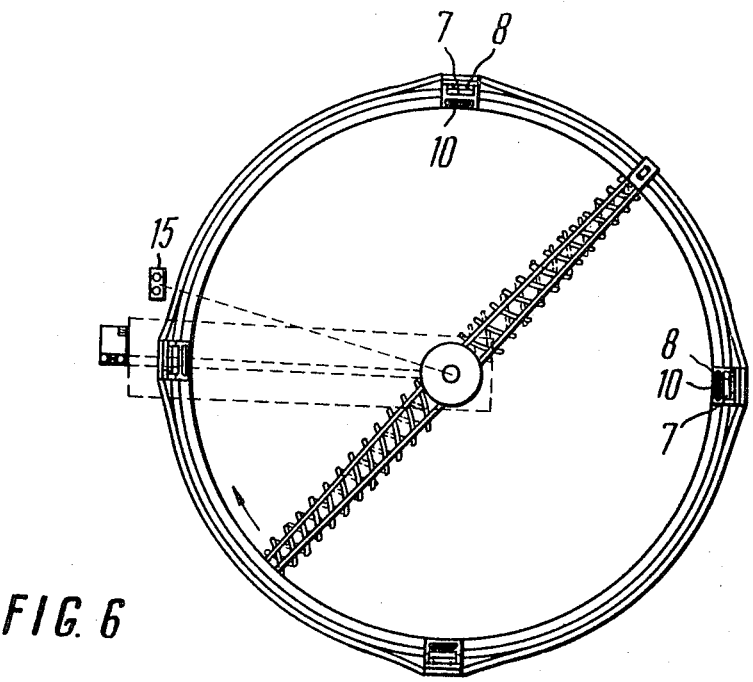
FIG. 6 is a plan view of FIG. 5.

In a third embodiment of the apparatus (according to FIGS. 5 and 6), the liquid to be purified is supplied under pressure into a V-shaped pipe or drained from the spillway, as is shown in FIG. 5. The V-shaped pipe is disposed below the settling tank vertically or in an inclined position (as shown by the dotted lines). By means of compressor 19 via a pipe 20, into a pipe 16 air and, if necessary, gases, such as oxygen, ozone and carbon dioxide, are supplied, which gases dissolve under the pressure of the liquid being purified.

The liquid arrives into the chamber 4 through the horizontal pipe. The gases, evolving from the liquid as a result of the pressure decrease, precipitate on the hydrophobic substances as extremely small air bubbles, ensuring the floating of said substances.

Accumulated at the surface of the liquid, the substances are directed by means of the shield 6 in laminar and horizontal streams to devices for the removal of said substances, which operation is facilitated by rakes 17, the devices being of the same type as that employed in the second embodiment.

The present invention must provide the following engineering and economical factors when treating sewerage waters of the petroleum industry and petroleum refining.

As compared with methods of settling down water in any types of settling tanks, there is ensured a reduction of areas required for their construction, from dozens of hectares to one hectare (with a consecutive combination of the three above-mentioned embodiments of the method of the present invention); the reduction by 5 to 6 times of the cost of the construction of purifying plants, and a considerably higher degree of purification of water; as compared with flotation with the similar degree of purification, there are obtained the reduction of capital expenditures and of maintenance costs by as much as 6 to 7 times, the reduction of consumption of electric power per cu.m. of water being purified by as much as 20 to 25 times; in contradistinction to quartz filters, there are obtained a reduction of capital expenditures and of maintenance costs by as much as 9 to 10 times, a reduction of electric power consumption by as much as 20 to 25 times, also with the same degree of purification.

Though the present invention is described in connection with its preferred embodiments, and is applicable to a particular case of its employment, it is understood that modifications and variations may be made therein without departing from the spirit and scope of the invention, which will be readily understood by those skilled in the art.

These modifications and variants are considered as falling within the spirit and scope of the invention and the appended claims.

What is claimed is:

1. Apparatus for purifying a liquid containing hydrophobic substances and matter having a density less than or equal to that of the liquid to be purified, said apparatus comprising a settling tank having opposite ends and being adapted to receive a horizontally flowing stream of liquid in one end thereof, and in which stream there is caused to ascend hydrophobic substances, a chamber adjoining said settling tank at said one end thereof for supplying a liquid to be purified and for saturating the liquid with a gas which causes said hydrophobic substances to ascend, said chamber communicating with the settling tank in an upper portion thereof, a horizontally rotatable shield in said chamber for controlling the depth of the horizontal stream of liquid in the settling tank by regulating the flow of liquid from the chamber to the settling tank, means adjacent the other end of the settling tank for removing from the horizontally flowing stream of liquid the hydrophobic substances which have ascended, said means for removing the hydrophobic substances comprising a rotatable adhesion drum having a surface to which hydrophobic substances adhere, means associated with the rotatable adhesion drum for removing the hydrophobic substances adhering thereto, means associated with and disposed under the rotatable adhesion drum for preventing the hydrophobic substances from re-entering the horizontal stream of liquid being purified and trough means adjacent the rotatable adhesion drum for recovering the hydrophobic substances removed therefrom; said apparatus further comprising means in said other end of the settling tank for removing the liquid stream from which the hydrophobic substances have been removed.

2. Apparatus according to claim 1 comprising a V-shaped pressure pipe line for supplying the liquid to be purified to the chamber, said pressure pipe line having an apex disposed beneath the settling tank and a pipe for supplying a gas to said V-shaped pressure pipe line.

3. Apparatus according to claim 1 wherein the means for removing the liquid stream comprises a drain sill.

4. Apparatus according to claim 1 comprising a plurality of settling tanks and chambers arranged in cascade relation with each of said settling tanks communicating with the next succeeding chamber.

References Cited

UNITED STATES PATENTS

| | | | |
|---|---|---|---|
| 1,379,176 | 5/1921 | Foster. | |
| 1,442,306 | 1/1923 | Stonebraker | 210—255 |
| 2,746,605 | 5/1056 | Baum | 210—205 X |
| 3,015,396 | 1/1962 | Quast | 210—221 |
| 3,302,792 | 2/1967 | Hikes et al. | 210—207 |

REUBEN FRIEDMAN, *Primary Examiner.*

JOHN ADEE, *Assistant Examiner.*

U.S. Cl. X.R.

210—221, 255, 521, 540